Sept. 8, 1931.  J. HARDING, JR  1,822,287
CONTROL DEVICE
Filed Sept. 15, 1930
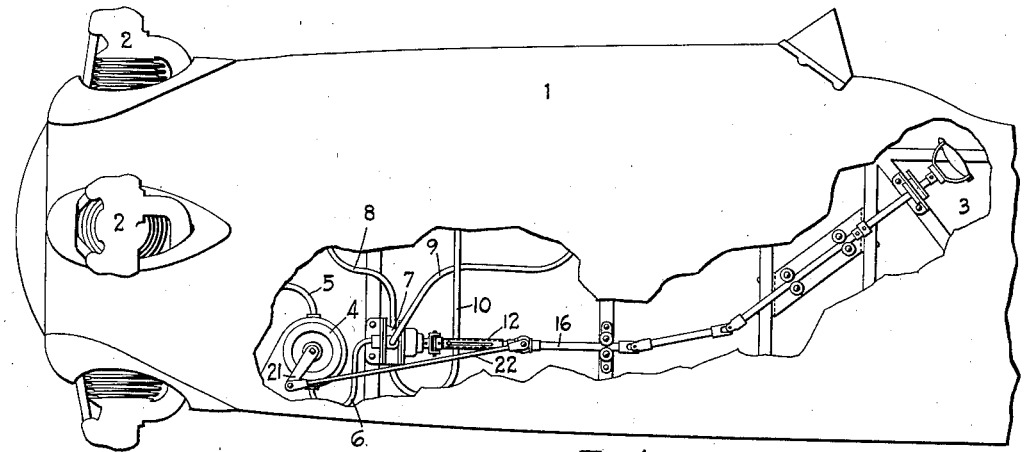
Fig. 1
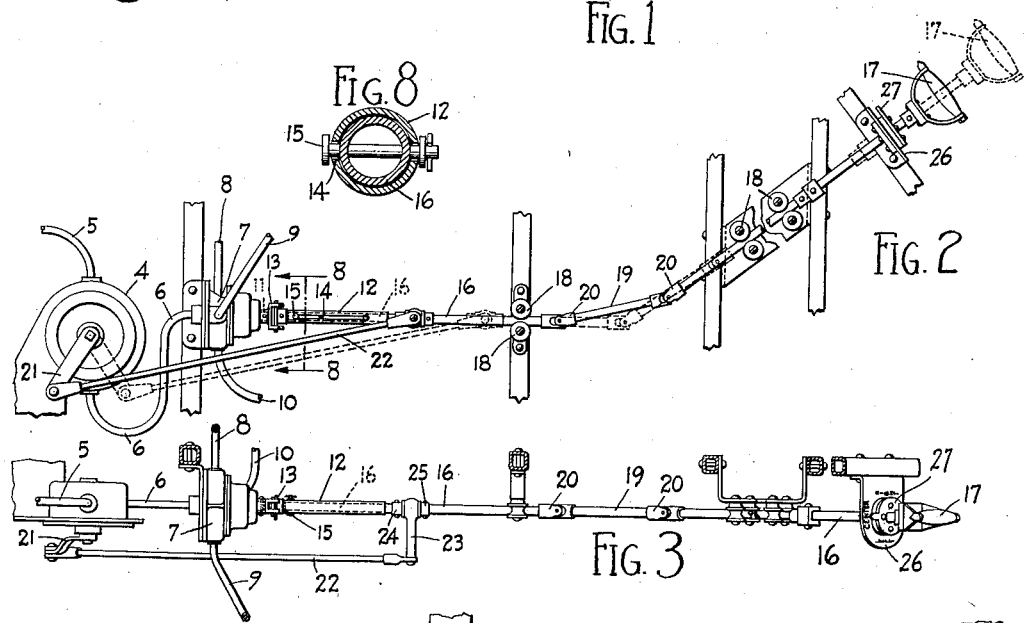
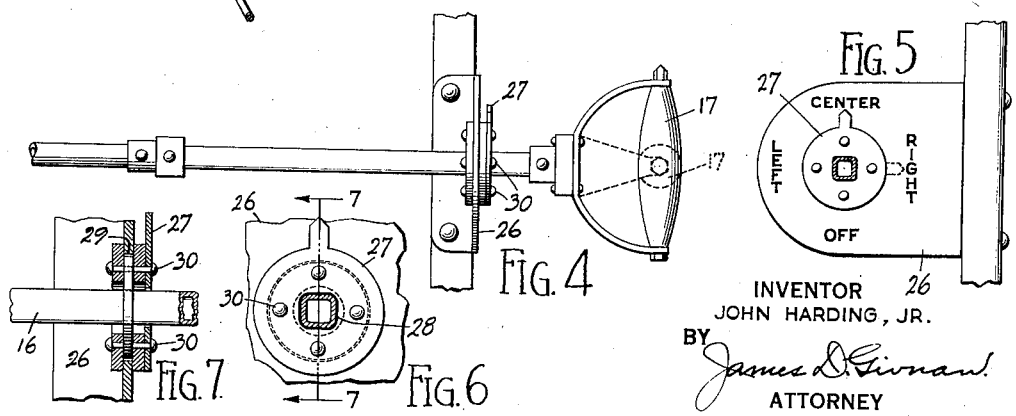
INVENTOR
JOHN HARDING, JR.
BY
James D. Givnan
ATTORNEY Patented Sept. 8, 1931

1,822,287

UNITED STATES PATENT OFFICE

JOHN HARDING, JR., OF SEATTLE, WASHINGTON, ASSIGNOR TO BOEING AIRPLANE COMPANY, OF SEATTLE, WASHINGTON

CONTROL DEVICE

Application filed September 15, 1930. Serial No. 481,983.

This invention relates to improvements in airplanes and more especially to accessories thereof in connection with fuel handling devices as used in present day fuel systems for aircraft.

The principal object of my invention is to provide a single means for actuating two separate devices, such for instance, as a distributor valve and a hand pump which heretofore required individual actuating devices such as a rotatable shaft for the distributor valve and a push rod for the hand pump.

My invention resides in providing a single rotatable and slidable shaft for actuating the distributor valve and hand pump, whereby the operator may use one hand to accomplish the desired setting of the distributor valve and at the same time actuate the hand pump.

This and other objects will appear as my invention is more fully hereinafter described in the following specification, illustrated in the accompanying drawings, and finally pointed out in the appended claims.

Figure 1 is a fragmentary side elevation of an airplane fuselage with a portion of its covering broken away to show my improved single actuating means operatively mounted within.

Figure 2 is an enlarged side elevation of the complete actuating device in operative engagement with a hand pump and distributor valve.

Figure 3 is a top plan view of Figure 2.

Figure 4 is an enlarged side view of a handle and indicating means.

Figure 5 is an end view of Figure 4 with the handle removed.

Figure 6 is a view showing the indicator embracing a square shaft.

Figure 7 is a sectional view taken on the line 7—7 of Figure 6.

Figure 8 is a sectional view taken on the line 8—8 of Figure 2.

A conventional airplane fuselage is indicated at 1, with its engine 2 and a pilot's compartment 3. A hand pump 4, mounted within the fuselage, delivers fuel to the fuel system units and engine carburetor by means of a fuel line 5. The pump draws fuel through a line 6 from a distributor valve indicated at 7. This distributor valve receives fuel selectively from a plurality of separate fuel tanks (not shown) by means of fuel lines 8, 9 and 10.

The distributor valve is formed with a shaft 11 to which is secured a tubular extension 12 by means of a universal joint 13. The tube is slotted as at 14 to receive a pin 15 which is carried by a shaft 16, the end of which is slidably mounted within the tube 12. The shaft 16 extends from the distributor valve to a point within convenient reach of the pilot and terminates in a handle 17. Rollers 18 are rotatably mounted to the structural members of the fuselage at various points throughout the length of the shaft. These rollers permit of easy forward and rearward movement of the shaft. Links 19 with suitable universal joints 20 are interposed in the shaft to accommodate various angles of installation and operation. The fuel pump 4 is provided with a crank arm 21 to which is pivotally connected one end of a link 22. The opposite end of the link connects with an arm 23 which is mounted on the shaft 16 in such a manner that the arm will not swing when the shaft is rotated but will move fore and aft with the shaft. The arm is thus mounted to the shaft by any suitable means, such for instance, as the collars 24 and pins 25.

The shaft 16, near the operator's end, passes through a bracket 26, upon the face of which is stamped the words "Left", "Center", "Right", and "Off" which correspond with the fuel tanks communicating with the distributor valve. As indicator 27, formed with a squared aperture 28, is adapted to embrace the shaft and to turn with it so that the operator can readily determine which tank is feeding to the distributor valve.

As shown in Figures 6 and 7, the indicator is mounted to a plurality of washers, the center of which snugly embraces the shaft and fits within an aperture 29 in the bracket. This forms a bearing for the shaft while the two outside washers form thrust bearings. All three washers and the indicator are joined together by means of pins or rivets 30.

The upper end of the handle 17, as shown in Figure 4, is provided with a pointed extension so that an operator can quickly and conveniently determine by feel, the position of the indicator without looking at the pointer. This is particularly useful in night flying.

In the operation of my device, it is obvious from the foregoing that an operator may actuate the hand pump regardless of the setting of the indicator and the distributor valve. It is also obvious that the setting of distributor valve may be readily changed during the pumping operation without any interruption therein. Should one tank of fuel run dry during a flight, the pilot can instantly, through the turning of the handle 3, commence to draw fuel from another tank, and if air has entered the fuel line by means of the running dry of the first tank, air locks can be forced out and the entire system be filled with fuel by operation of the hand pump by means of the same handle 3. The presence of such air locks constitutes a source of serious danger, in that it may necessitate a forced landing unless it can be instantly corrected, and hence it is important that the pilot have means at his command, while in flight and while one hand is occupied with the control stick, whereby he can immediately draw fuel from a fresh tank and can clear the system of air, or in case of failure of the power pump, he can insure a continued supply of fuel without the necessity of shifting grips or locating the pump handle after he has operated the distributor valve.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:—

Claims:

1. In a device of the class described, in combination with a hand pump and a distributor valve, a shaft rotatably and slidably mounted and in operative engagement with the hand pump and the distributor valve, means formed on said shaft for permitting selective operation of either the said hand pump or said distributor valve, said means including a sliding connection between the shaft and the distributor valve, and a link interconnecting said shaft with the hand pump by means of a radially extending arm on the shaft, said arm being arranged for reciprocal movement with the shaft but not rotary movement.

2. In a device of the class described, in combination with a hand pump and a distributor valve, a man shaft slidably and rotatably mounted, one end of said main shaft connecting with the fuel distributor valve, the opposite end of said main shaft terminating in a handle, an indicating plate embracing said shaft and a pointer to turn with said shaft, a supplemental shaft arranged substantially parallel to and extending beyond the first mentioned shaft, said supplemental shaft connecting with the fuel pump and adapted for reciprocal movement with said main shaft when actuating said pump.

3. In combination with a fuel pump and operating means therefor operated by a forward and back movement, and with a rotary distributor valve for supplying fuel to said pump from one of several supply sources, a reciprocably and rotatably mounted control handle distant from the pump and valve, and means operatively connecting said handle and both the pump operating means and valve.

4. In combination with a fuel pump and operating means therefor operated by a forward and back movement, and with a rotary distributor valve for supplying fuel to said pump from one of several supply sources, a reciprocably and rotatably mounted control handle distant from the pump and valve, means operatively connecting said handle with the valve, for rotation thereof, and means connected to the latter means, intermediate the handle and the pump, for operatively connecting the handle and pump operating means.

5. In combination with a fuel pump and operating means therefor operated by a forward and back movement, and with a rotary distributor valve for supplying fuel to said pump from one of several supply sources, a reciprocably and rotatably mounted control handle distant from the pump and valve, a pair of telescoping shaft members one of which is connected to the distributor valve, an arm swiveled upon the other telescoping shaft member to reciprocate therewith, a link connecting said arm with the pump operating means, and a rotatable and reciprocable connection between the last-mentioned of the telescoping shaft members and the control handle.

6. The combination of claim 5, the connection to the control handle comprising relatively angularly disposed rigid sections and guides therefor permitting their rotary and reciprocating movement, and links connecting such sections through universal joints.

In testimony whereof I affix my signature.

JOHN HARDING, Jr.